United States Patent [19]

Wyder et al.

[11] Patent Number: 4,786,079
[45] Date of Patent: Nov. 22, 1988

[54] WEB GUIDE AND EMERGENCY LOCKING ASSEMBLY

[75] Inventors: Manfred Wyder, Rowland Heights; William Hollowell, Pacific Palisades, both of Calif.

[73] Assignee: American Safety Corporation, Troy, Mich.

[21] Appl. No.: 934,953

[22] Filed: Nov. 26, 1986

[51] Int. Cl.[4] .................. B60R 22/42; B60R 21/00
[52] U.S. Cl. ................................ 280/808; 280/801; 280/806; 242/107.2
[58] Field of Search ............ 280/808, 801, 804, 803, 280/807; 242/107.2

[56] References Cited

U.S. PATENT DOCUMENTS

| | | | |
|---|---|---|---|
| 2,193,407 | 3/1940 | Hagen | 24/136 R |
| 3,993,328 | 11/1976 | Henderson et al. | 280/807 |
| 4,128,261 | 12/1978 | Paitula | 297/478 |
| 4,249,708 | 2/1981 | Asano | 242/107.2 |
| 4,437,623 | 3/1984 | Wyder | 242/107.2 |
| 4,491,343 | 1/1985 | Fohl | 280/806 |
| 4,544,112 | 10/1985 | Ziv | 242/107.2 |
| 4,621,835 | 11/1986 | Edwards | 280/803 |
| 4,624,422 | 11/1986 | Hollowell | 280/806 |
| 4,667,981 | 5/1987 | Koide | 280/806 |

FOREIGN PATENT DOCUMENTS 8600585 1/1986 Fed. Rep. of Germany .
2383677 3/1978 France .

Primary Examiner—Richard A. Bertsch
Attorney, Agent, or Firm—Poms, Smith, Lande & Rose

[57] ABSTRACT

A vehicle seat belt utilizing a web guide and emergency locking assembly comprising a mounting frame for mounting the web guide and emergency locking assembly to an interior surface of the vehicle having a front bearing surface of non-chafing material, a retainer guide affixed to the web guide mounting bracket and further comprising a plurality of reaction springs mounted upon a plurality of dimples separated by a stopping means on its top surface, a wedge block slidably mounted upon the retainer guide and pivotly interconnected with the mounting frame having a front bearing surface of non-chafing material, a wedge block actuator resting upon the plurality of reaction springs and enclosing the wedge block, and a camming surface on each interior surface of each side member of the actuator complementary to each pin affixed to each side surface of the wedge block wherein the interaction between the wedge block and the camming surfaces contained on the actuator moves the wedge block towards the mounting frame to lock the seat belt webbing.

12 Claims, 3 Drawing Sheets

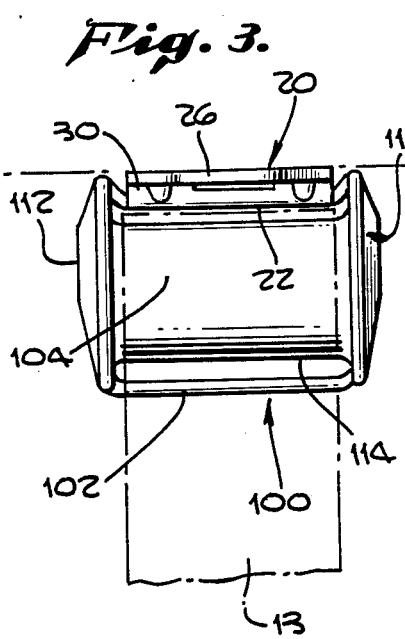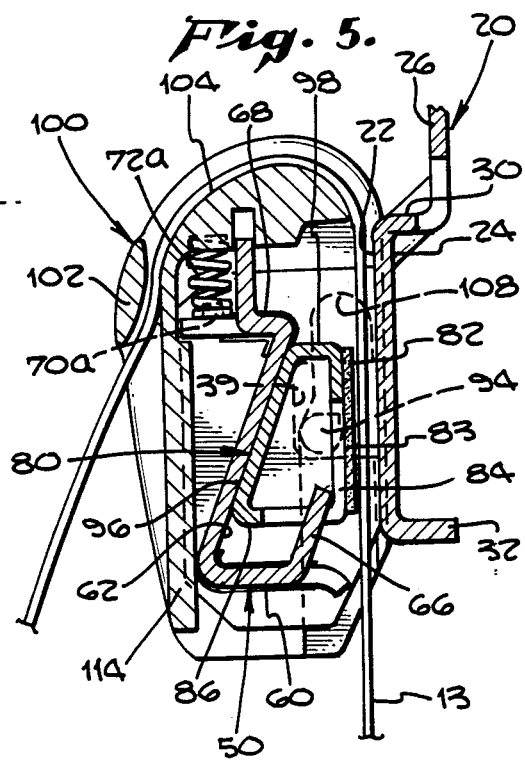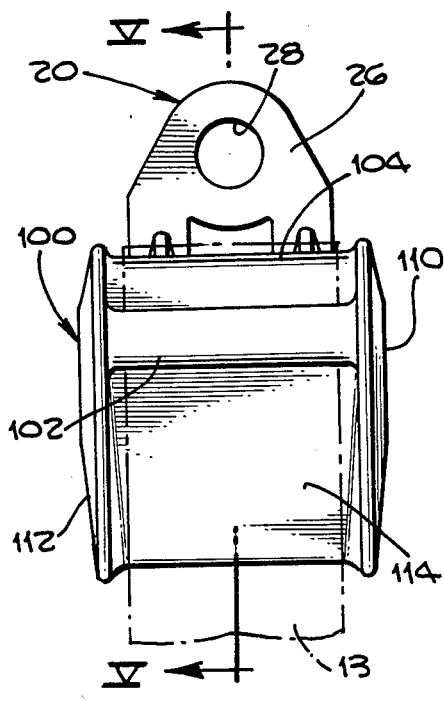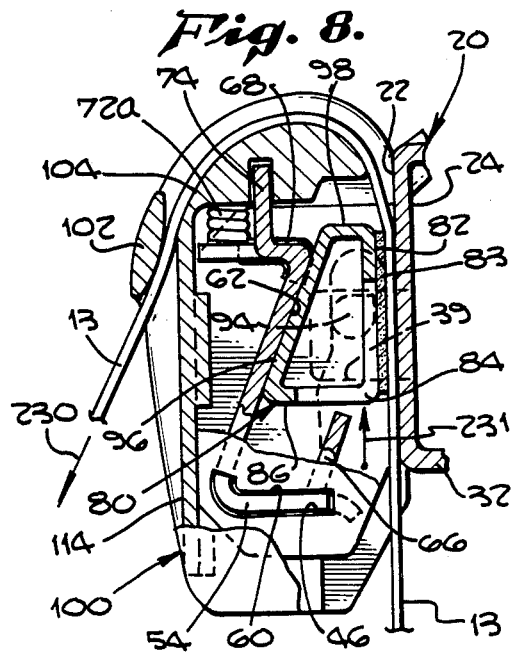

WEB GUIDE AND EMERGENCY LOCKING ASSEMBLY

BACKGROUND OF THE INVENTION

This invention relates in general to safety belt systems utilized in automotive vehicles for restraining passengers in their seats during emergency conditions encountered by the vehicle, and more particularly to safety belt restraint devices employed for restraining a single belt in the event of such emergency conditions.

It is presently common practice in the automotive industry to use occupant restraint devices wherein safety belts employed in the systems are wound upon automatic, emergency locking safety belt retractors secured to the vehicle frame. When such automatic locking safety belt retractors are also employed as the anchoring means for the safety belt, the retractors are of necessity made of high strength materials for load bearing which increases their cost of manufacture and assembly. It has also become apparent that there is a certain amount of safety belt webbing extension encountered on the locking of such retractors due to the tightening of belt webbing about the retractor spool and the extension of the webbing portions stored in the retractor.

Web clamping means have been provided heretofore in association with the retractor mechanisms to quickly clamp the webbing in an emergency situation to overcome any undesirable webbing extension encountered on locking of the retractor. An example of such a retractor means-web clamping means arrangement is found in U.S. Pat. No. 4,544,112. However, it would be desirable to be able to employ a light weight, low load, perhaps even plastic material construction for a retraction mechanism if the load bearing and reduced webbing extension features discussed could be maintained.

It is therefore a primary object of the present invention to provide an emergency locking safety belt restraint assembly which will operate independently of a belt storage retractor which may be made of a light weight, even plastic material construction, and which will operate directly upon the safety belt webbing in a quickly operating and reliable manner in the event of an emergency condition. More specifically, it is the object of the present invention to disclose and provide a web guide and emergency locking assembly which provides a quick acting positive restraint of the belt in the event of an emergency, reduces belt webbing extension after activation of the emergency locking retractor due to webbing portions about the retractor spool and to provide a positive restraint on the webbing without damaging the webbing and without interferring with the normal operation of an emergency locking retractor where one is employed. Furthermore, the assembly is small in size and light in weight.

SUMMARY OF THE INVENTION

Generally stated, the web guide and emergency locking means is designed to allow the belt to move freely through it during non-emergency conditions. In an emergency condition resulting in vehicle decacceleration, the occupant has a tendency to move forward in the seat, this movement will cause the belt to exert a force greater than a predetermined force on a light weight one piece molded wedge block actuator to offset a biasing means in the assembly. The actuator will move downward with a self-contained actuator camming surface shifting the wedge block toward engagement with the belt. Additional belt movement results in the wedge clamping the belt between the block and mounting frame bearing surfaces. Non-chafing faces are incorporated on the block and mounting frame bearing surfaces to avoid belt wear.

The web guide and emergency locking means is suitable for use in conjunction with a chest and lap belt combination or a chest belt and knee pad combination.

DESCRIPTION OF THE DRAWINGS

FIG. 3 is a top view of a safety belt passing over the web guide and emergency locking means.

FIG. 4 is a front view of the web guide and emergency locking means.

FIG. 5 is a detailed section view taken in FIG. 4 along plane V—V.

FIG. 6 is a detailed section view, showing the locking means in an intermediate stage of the locking condition.

FIG. 7 is a transverse cross section of the assembly shown in FIG. 6 through plane VII—VII.

FIG. 8 is a detailed section shown in a safety belt locking condition.

DETAILED DESCRIPTION

Figure 1:
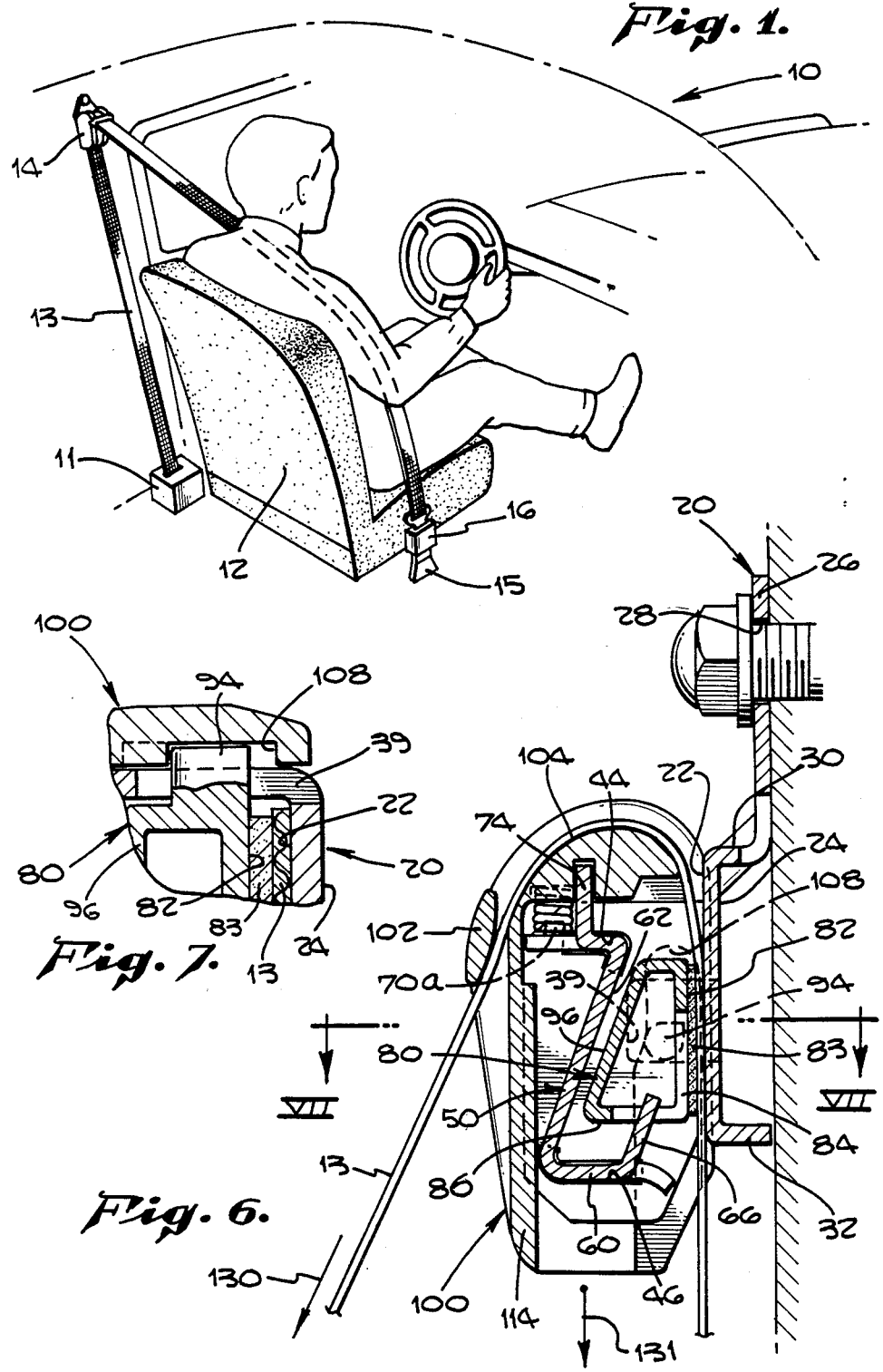
FIG. 1 shows an exemplary embodiment of the seat belt system in accordance with the present invention.

An exemplary embodiment of the web guide and emergency locking means 14 of the present invention is shown if FIG. 1 mounted at the upper area of the B-pillar of an automobile. Vehicle 10 shows a seat belt system which includes a seat belt retractor means 11 mounted adjacent to the seat 12 in order to maintain the chest belt 13 in a coiled form when not in use and in an unslackened form during use. A web guide and emergency locking means 14 is mounted at the upper area of the B-pillar of vehicle 10 for normally guiding the safety belt 13 above the shoulder of an occupant from the retractor 11 to a floor anchor 15. A buckling means 16 is affixed to the safety belt in order to fasten it to anchor 15.

During an emergency stopping condition, the web guide and emergency locking means will prevent movement in the chest belt such that the occupant of the vehicle will be restrained in an approximately upright position. The operation of the web guide and emergency locking means can best be understood by a thorough description of the various components of this device.

Figure 2:
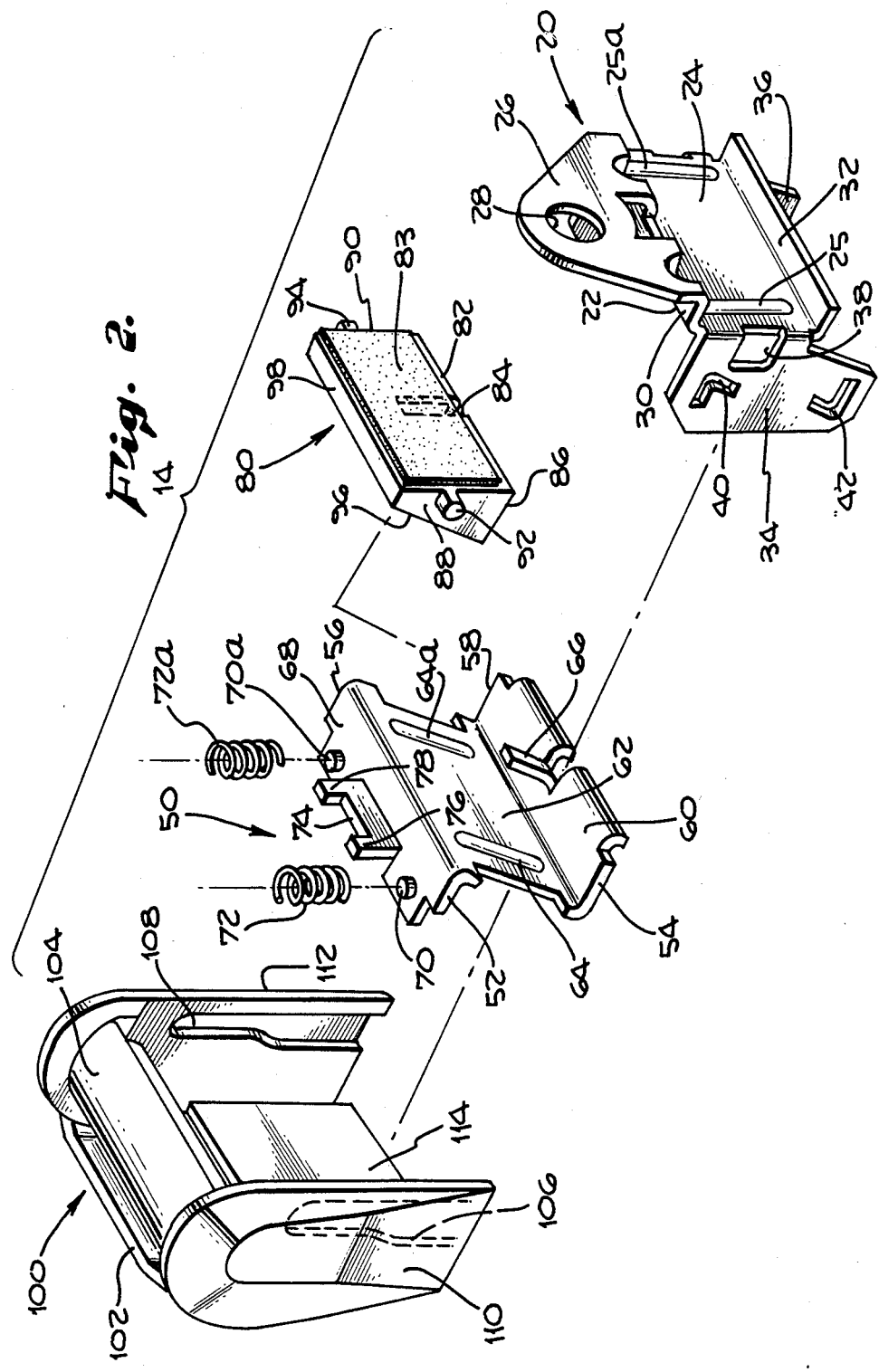
FIG. 2 shows an exploded view of the web guide and emergency locking means in accordance with the present invention.

In the exemplary embodiment of the web guide and emergency locking means the preferred structure of the components comprising the locking means can be seen in FIG. 2. The interaction of the components are disclosed FIGS. 3–8.

Mounting frame 20 is used to affix the web guide and emergency locking means 14 to the B-pillar of an automobile. The mounting frame 20 has a front bearing face 22 against which the chest belt 13 may be clamped. In the exemplary embodiment the front bearing face 22 comprises a front bearing surface of non-chafing material. The exemplary mounting frame 20 has a back wall 24 with stiffening ribs 25, 25A. A mounting flange 26 having a mounting aperture 28 is connected to the front bearing surface 22 through top surface 30. Lower frame support 32 is located opposite to and approximately parallel with top surface 30 and is approximately perpendicular to back wall 24. This structural design provides for the mounting frame 20 to be rigidly constructed and may be rotatably or rigidly affixed to the interior surface of the vehicle as shown in FIG. 6.

Wedge block and means for mounting it to said frame 20 are provided for clamping the chest belt against the face 22 of non-chafing material when the belt is entrained between the exemplary wedge block 80 and the front bearing face 22 which occurs when the wedge block 80 is moved into engagement with the chest belt 13. The exemplary wedge block and mounting means includes wedge block 80 and retainer guide 50. The wedge block has a front surface 82 containing a groove 84 for tab guide 66 for slidably mounting upon the retainer guide 50. A front bearing surface of non-chafing material 83 is affixed to the front surface of the wedge block 82. Back surface 96 is inclined at an acute angle to the bottom surface 86 and complementary to the retainer guide lateral surface 62. Pin 92 is affixed to side surface 88. Pin 94 is affixed to side surface 90. These pins 92, 94 are located adjacent to the front surface 82 and complementary to a camming slot on each interior surface of each side member of the wedge block activator 100. The top surface is denoted by 98.

In the exemplary embodiment wedge block 80 is slidably mounted upon the retainer guide 50 and interconnected with the mounting frame 20 through confines of slots 38 and 39. Wedge block pin slot 38 on side flange 34 is positioned near the intersection of the side flange 34 and front bearing surface 22. Likewise, wedge block pin slot 39 on side flange 36 has a similar orientation to wedge block pin slot 38. The wedge block 80 is positioned between the side flanges 34, 36 whereby pins 92, 94 are located in wedge block pin slots 38, 39.

The retainer guide 50 is affixed to the mounting frame 20 for enabling the wedge block 80 to be slidably mounted thereon. L slots 40,42 on side flange 34 and L slots 44, 46 on side flange 36 are provided for affixing the retainer guide 50 to the mounting frame 20. Ears 52, 54, 56, 58 located on retainer guide 50 have orientations complementary to L slots 40, 42, 44, 46 on side flanges 34, 36.

The exemplary embodiment of the retainer guide 50 has a tab 66 affixed to bottom surface 60, directed in an approximately upward vertical orientation for the slidable movement of the wedge block. The outer edges of bottom surface 60 are curved under in order to minimize any abrasion of the safety belt and improve structural strength and rigidity. A guide means is also affixed to the top surface 68 for limiting the movement of the wedge block actuator during activation by the chest belt. Means for biasing the wedge actuator 100 to enable the chest belt 13 to move in an unrestrained manner during non-emergency stopping situations is included in the design of retainer guide 50. The means for biasing comprises a plurality of dimples 70, 70a to hold a plurality of reaction springs 72, 72a mounted upon the dimples. It has been determined the reaction springs with a spring force in the range of 5 to 50 pounds will best accomplish the objectives of this invention. The belt will be able to be moved in an unrestrained manner during non-emergency stopping situations but be restrained in an emergency condition.

Retainer guide bottom surface 60 is oriented at an acute angle to lateral surface 62 such that the bottom surface and lateral surface will be complementary to the back surface 69 of the wedge block 80. Stiffening ribs 64, 64A are located on lateral surface 62.

The guide means located upon the retainer guide 50 top surface 68 is shown as a U-shaped guide, the base of the guide 74 represents a stopping surface and the two guiding channels for the actuator are shown at 76 and 78. The U-shaped guide and stop limits the advance of the wedge block actuator so that the biasing means will not be overstressed.

An exemplary wedge block actuator means 100 moves the wedge block 80 into engagement with the belt. The actuator means 100 comprises a lightweight one piece molded shell having a belt entraining means entraining the belt thereover. The exemplary actuator further has a block camming means for camming said block into enagement with the chest belt 13 on a downward pull of said belt entraining thereover and biasing means normally biasing said shell in an upward position. The wedge block actuator means 100 has a belt entraining means comprising a retaining bar 102 and a curved non-chafing top guiding surface 104. Wedge block camming means 106, 108 are located on the inside surfaces of side members 110, 112. Back member 114 is joined to the side members 110, 112 to provide structural support for the wedge block actuator means. The lower surface of the actuator top guiding surface 104 has corresponding complementary surfaces for the reaction springs 72, 72A, the guiding channels 76,78, and the stopping surface 74.

FIG. 3, a top view of the wedge block actuator means shows chest belt 13 passing below retaining bar 102 and over the top web guide 104. The position of the chest belt on the actuator is disclosed in FIG. 4.

The exemplary embodiment of the invention illustrated in FIG. 5 shows the wedge block 80 and actuator means 100 in the biased upward position. Chest belt 13 can freely pass between mounting frame 20 and wedge block 80. Wedge block pin 94 is located at the lowest point in wedge block camming means 108. The complementary orientation of the retainer guide lateral surface 62 and the back surface of the wedge block is clearly illustrated. This view shows the wedge block is constructed from appropriate guage material of suitable strength. However, it is preferable that the wedge block be of solid construction.

A downward movement of chest belt 13 in the direction of 130 resulting from an emergency condition where force exerted upon the chest belt exceeds the upward force of the biasing springs 72, 72a causes the actuator to be moved downward, as shown by the arrow 131 in FIG. 6. The wedge block actuator means 100 movement has shifted the wedge block 80 towards the mounting frame 20 by the interaction of the camming slots 106, 108 with the wedge block pins 92, 94. Wedge block pins 92, 94 have shifted from the rearward orientation in the pin slots 38,39 to a forward orientation in the slots. The pins are positioned at the approximate midpoint on the camming surfaces. As a result of this movement, a gap can be seen between lateral surface 62 and wedge block 80. The reaction springs have been compressed by the downward movement of the wedge block actuator as can be shown by spring 72A.

As illustrated in FIG. 6, the downward movement of the wedge block actuator 100 reorients the wedge block 80 to a belt engaging position. This downward movement causes the self-contained actuator camming slots 106, 108 to shift wedge block pins 92, 94 towards the mounting frame front bearing face 22. This relocation of the wedge block pin 94 within camming slot 108 is illustrated in FIG. 7.

The additional downward movement of the belt 13 shown by the arrow 230 has an associated upward movement through the web guide and emergency locking means. The belt upward movement imparts in upward movement, shown by arrow 231, to the wedge block until the wedge block back surface 96 engages the inclined lateral surface 62 of the retainer guide resulting a clamping force on chest belt 13. The inclination angle results in an amplified clamping force to ensure that slippage is prevented. The chest belt in a fully clamped condition is illustrated in FIG. 8.

From the above disclosure, it can be understood that the web guide and emergency locking means prevents movement in the chest belt by a sudden repositioning of a passenger in an emergency stopping condition. This sudden repositioning results in a downward pull on the chest belt sufficient to overcome the upward force of the biasing means upon the wedge block actuator thus causing the actuator to shift the wedge block toward the belt in the assembly. Additional movement of the belt causes the wedge block to engage the lateral surface of the retainer guide resulting in a clamping and locking force to be exerted on the belt passing through the opposing non-chafing material surfaces.

As should now be apparent to those skilled in the art, from the foregoing detailed description, the exemplary web guide and emergency locking means illustrated generally at 14 may be used as the primary belt locking means or in a dual locking system with a locking means included in the chest belt retractor.

We claim:

1. A seat belt system for use in vehicles having a seat, said system having a seat belt retractor means mounted adjacent to the seat to maintain the belt in a coiled form when not in use and in an unslackened form during use, a web guide and emergency locking means mounted at the upper area of the B-pillar of an automobile for normally guiding a chest belt above the shoulder of an occupant from the retractor to a floor anchor and for preventing movement of the chest belt such that the occupant will be restrained in an approximately upright position during an emergency stopping condition and a buckling means for fastening the chest belt to the anchor, wherein said web guide and emergency locking means comprises:
   a mounting frame having a front bearing face against which the chest belt may be clamped;
   a wedge block and means for mounting it to said frame for clamping the chest belt against said face when the belt is entrained between said block and said face and said block is moved into engagement with said belt; and
   a wedge block actuator means for moving said wedge block into engagement with said belt, said actuator means including a light weight one piece molded shell having a belt entraining means for entraining said belt thereover, a block camming means for camming said block into engagement with said belt on a downward pull of said belt entrained thereover and biasing means in contact with said shell normally biasing said shell in an upward position wherein said block is not cammed into engagement with said belt.

2. The seat belt system of claim 1 wherein said wedge block actuator entraining means further comprises a curved non-chafing surface on a top guiding surface for said belt to travel over from the retractor.

3. The seat belt system of claim 2 wherein a lower surface of the actuator guiding surface further comprises a complementary surface for the biasing means to bias said shell in an upward position and a plurality of guiding channels for the movement of the actuator on the wedge block and means.

4. The seat belt system of claim 1 wherein the wedge block and means for mounting it comprises a retainer guide affixed to the mounting frame for enabling the wedge block to be slidably mounted thereon.

5. The seat belt system of claim 4 wherein the means for biasing said wedge block actuator comprises at least one spring reaction surface which interacts with at least one spring affixed to the top surface of the retainer guide.

6. The seat belt system of claim 1 wherein the web mounting frame further comprises a front bearing surface of non-chafing material.

7. The seat belt system of claim 4 wherein the wedge block further comprises:
   a front surface containing a groove for a tab guide for slidably mounting upon said retainer guide;
   a bearing surface of non-chafing material affixed to the front surface of the wedge block; and
   a pin affixed to each side surface in a position complementary to a camming slot on each interior surface of each side member of the wedge actuator.

8. The seat belt system of claim 7 wherein the movable wedge block further comprises a back surface inclined at an acute angle to a bottom surface and complementary to a lateral surface on said retainer guide such that movement of the wedge block actuator results in a corresponding movement between the wedge block and the mounting frame.

9. The seat belt system of claim 4 wherein the retainer guide further comprises:
   a tab affixed to a bottom surface directed in approximately an upward vertical orientation for the slidable movement of the wedge block;
   a guide means affixed to a top surface for limiting the movement of the wedge block actuator during activation by the chest belt;
   a means for biasing the wedge actuator to enable the chest belt to move in an unrestrained manner during non-emergency stopping situations; and
   said top surface and bottom surface being joined by a lateral surface inclined at a complementary angle to that of the wedge block back surface.

10. The seat belt system of claim 9 wherein the means for biasing the wedge block actuator comprises at least one dimple to hold a corresponding number of reaction springs upon the top surface.

11. An improved seat belt utilizing a web guide and emergency locking means comprising:
   a mounting frame for mounting the web guide and emergency locking means to an interior surface of the vehicle having a front bearing surface of non-chafing material;
   a retainer guide affixed to the web guide mounting means and further comprising at least one reaction spring mounted upon a corresponding number of dimples and a stopping means on its top surface;
   a wedge block slidably mounted upon the retainer guide and pivotly interconnected with said mounting frame having a front bearing surface of non-chafing material; and a wedge block actuator resting upon at least one reaction spring and enclosing the wedge block, and a camming surface on each interior surface of each side member of said actuator complementary to each pin affixed to each side surface of the wedge block wherein the interaction between said wedge block and the camming surfaces contained on said actuator moves the wedge block toward the mounting frame to lock the seat belt webbing in an emergency stopping condition.

12. A seat belt system having a seat belt retractor means mounted adjacent to the seat to maintain the belt in a coiled form when not in use and in an unslackened form during use, a web guide and emergency locking means mounted at the upper area of the B-pillar of an automobile for normally guiding a chest belt above the shoulder of an occupant from the retractor to a floor anchor and for preventing movement in the chest belt such that the occupant will be restrained in an approximately upright position during an emergency stopping condition, a buckling means for fastening the chest belt to the anchor whereby said web guide and emergency locking means comprises:

a mounting frame for mounting the web guide and emergency locking means to an interior surface of the vehicle having a front bearing surface of nonchafing material;

a retainer guide affixed to the web guide mounting means and further comprising a plurality of reaction springs mounted upon a plurality of dimples separated by a stopping means on its top surface;

a wedge block slidably mounted upon the retainer guide and pivotly interconnected with said web guide mounting means having a front bearing surface of nonchafing material; and a wedge block actuator resting upon said plurality of reactions springs and enclosing the wedge block and a camming surface on each interior surface of each side member of said actuator complementary to each pin affixed to each side surface of the wedge block wherein the interaction with said wedge block and the camming surface contained on said actuator moves the wedge block toward the mounting frame to lock the seat belt webbing in an emergency stopping condition.

* * * * *